United States Patent [19]
Sterenberg

[11] Patent Number: 5,811,065
[45] Date of Patent: Sep. 22, 1998

[54] BURNER EXHAUST GAS COLLECTION ASSEMBLY FOR A CATALYTIC REFORMER

[75] Inventor: David J. Sterenberg, Vancouver, Canada

[73] Assignee: Ballard Generation Systems Inc., Burnaby, Canada

[21] Appl. No.: 840,027

[22] Filed: Apr. 24, 1997

[51] Int. Cl.⁶ ............................................. B01J 8/06
[52] U.S. Cl. ..................... 422/198; 422/196; 422/197; 422/211; 48/127.9
[58] Field of Search ................................ 422/197, 211, 422/204, 205; 48/94, 127.9; 208/134

[56] References Cited

U.S. PATENT DOCUMENTS

| | | | |
|---|---|---|---|
| 3,926,135 | 12/1975 | De Gregorio | 114/74 R |
| 4,071,330 | 1/1978 | Sederquist | 48/94 |
| 4,325,916 | 4/1982 | Worley | 422/197 |
| 4,661,323 | 4/1987 | Olesen | 422/197 |
| 4,921,680 | 5/1990 | Bonk et al. | 422/197 |
| 5,264,008 | 11/1993 | Corrigan | 48/94 |
| 5,470,360 | 11/1995 | Sederquist | 48/94 |
| 5,484,577 | 1/1996 | Buswell et al. | 422/211 |

FOREIGN PATENT DOCUMENTS

WO 97/05947  2/1997  WIPO.

*Primary Examiner*—Hien Tran
*Attorney, Agent, or Firm*—McAndrews, Held & Malloy, Ltd.

[57] ABSTRACT

A catalytic reformer includes a reformer vessel defining an interior plenum housing at least one reactor tube assembly having a catalyst bed. The reformer also includes a burner gas inlet for providing hot burner gas to heat the reactor tubes, and a burner gas outlet. A burner gas guide sleeve is disposed substantially coaxially around at least a portion of the reactor tube assembly, defining an annular burner gas passage. A burner exhaust gas collection assembly connects the burner gas guide sleeve to the burner gas outlet.

12 Claims, 4 Drawing Sheets

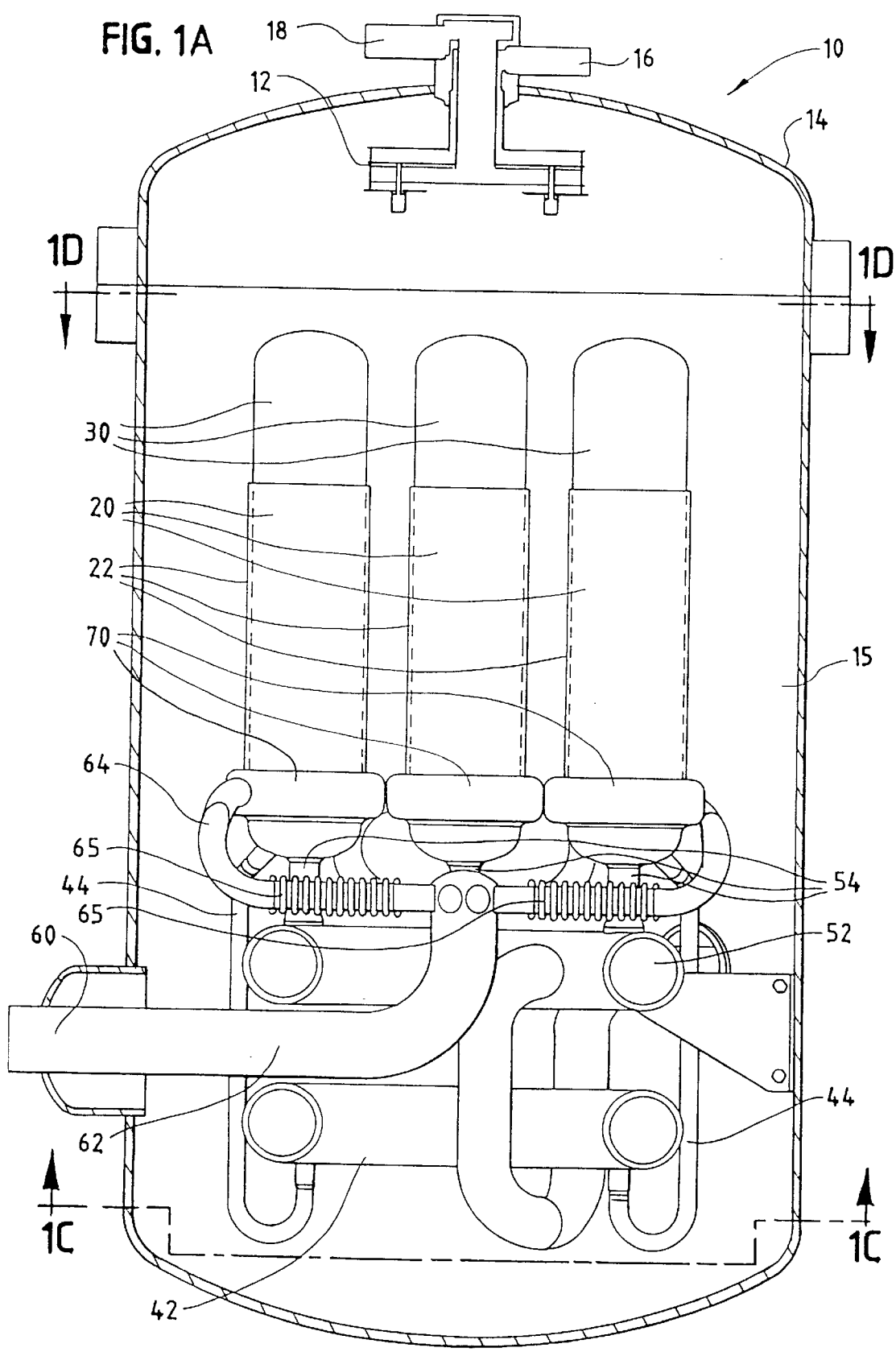

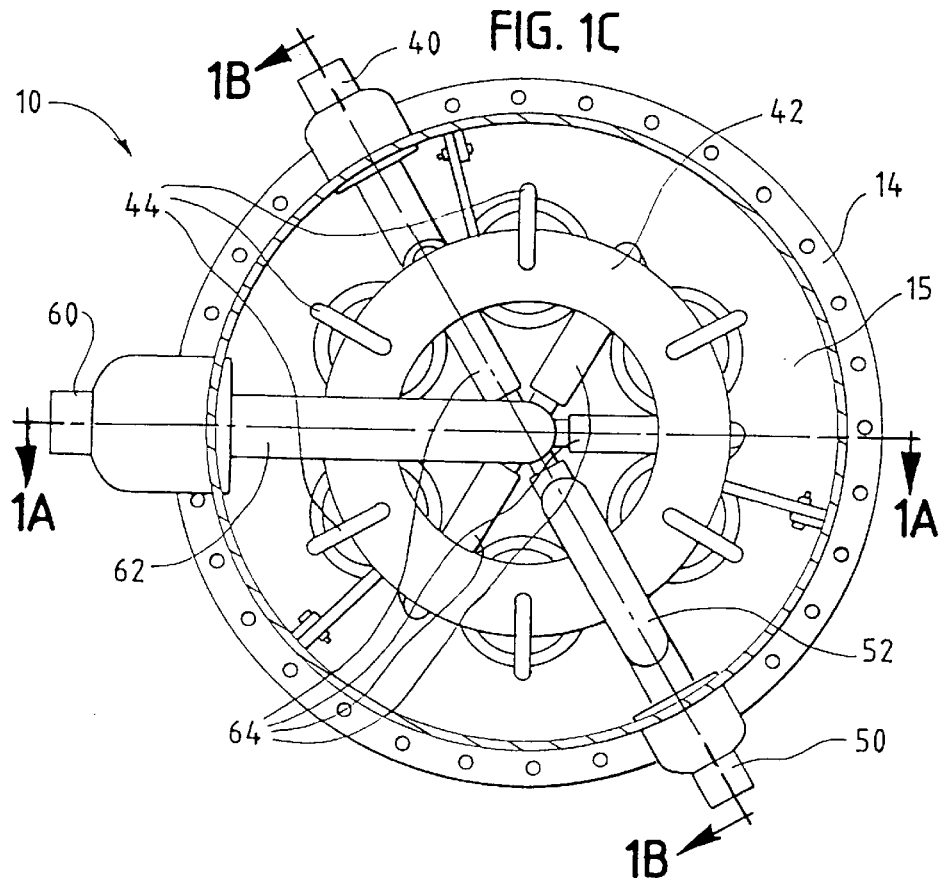
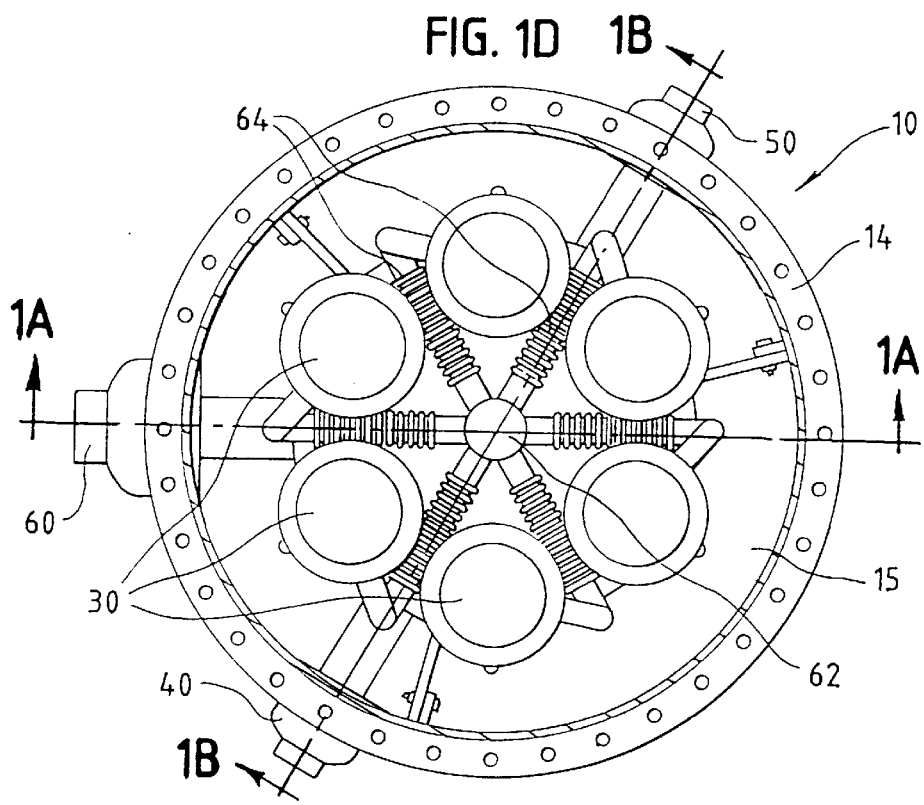

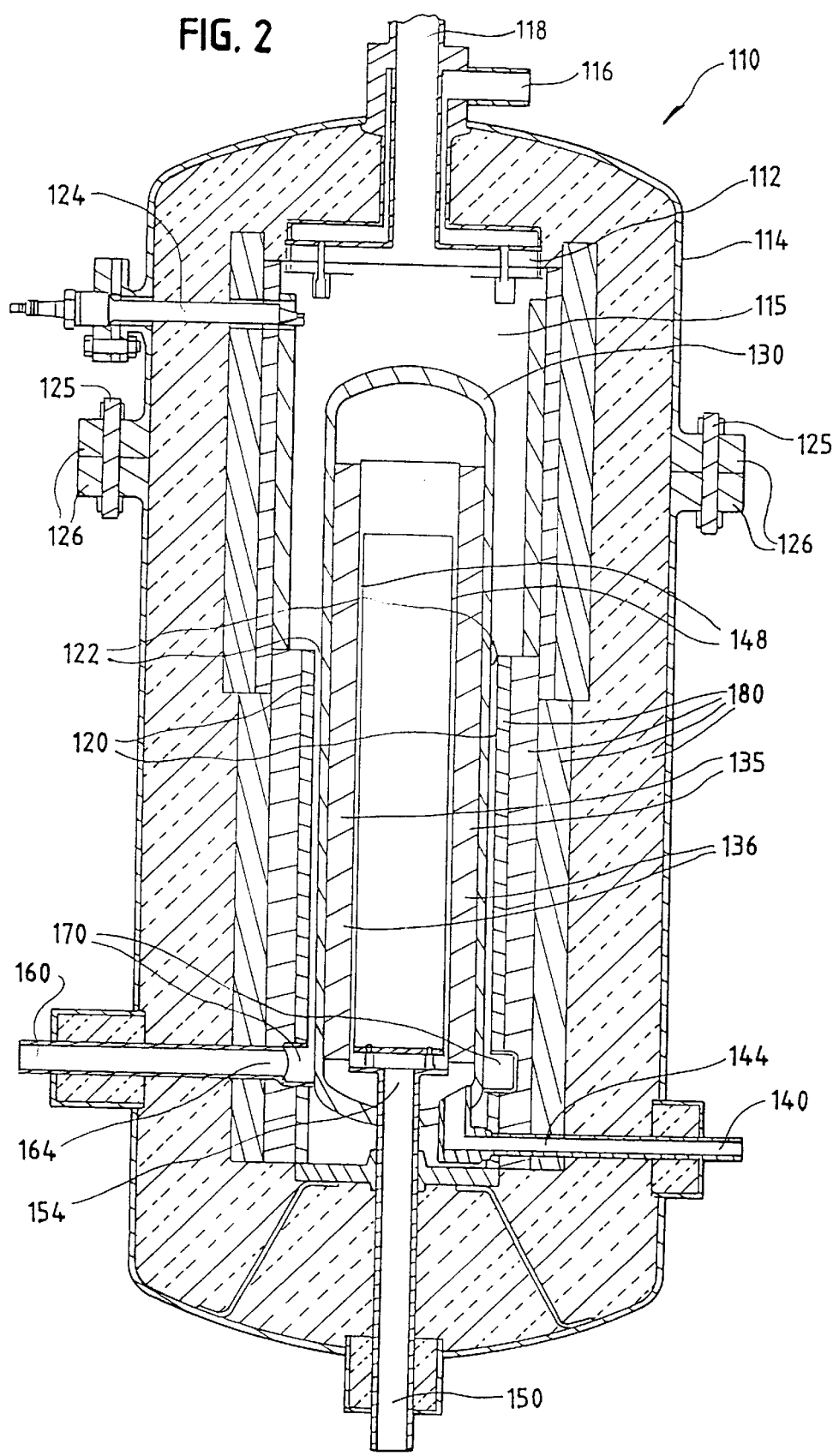

BURNER EXHAUST GAS COLLECTION ASSEMBLY FOR A CATALYTIC REFORMER

FIELD OF THE INVENTION

The present invention relates to a burner exhaust gas collection assembly for catalytic reformers.

BACKGROUND OF THE INVENTION

A catalytic reformer converts a fuel stream, comprising, for example, natural gas, light distillates, methanol, propane, naphtha, kerosene, and/or combinations thereof, and water vapor into a hydrogen-rich reformate stream. In fuel cell electric power generation systems employing a catalytic reformer, the hydrogen-rich reformate stream is generally purified, for example, by passing through a hydrogen separator or a shift reactor and a carbon monoxide selective oxidizer, prior to being used as the fuel stream delivered to the anode of an electrochemical fuel cell. In the reforming process, the fuel stream is typically percolated through one or more catalyst beds contained within a reformer vessel. For hydrocarbon fuels such as, for example, natural gas, the catalytic conversion process is normally carried out at elevated catalyst bed temperatures in the range of about 1200° F. to about 1600° F. Such elevated temperatures are typically generated by one or more burners, typically incorporated in the reformer vessel.

A typical catalytic hydrocarbon reformer is described and illustrated in U.S. Pat. No. 5,484,577, which is incorporated herein by reference in its entirety. This type of reformer typically comprises a substantially cylindrical closed pressure vessel as the reformer shell, with thermally insulated interior walls. At least one reactor tube assembly is disposed within the vessel, each reactor tube typically containing an outer annular catalyst bed and an inner concentric gas return tube. The fuel gas is directed through the outer catalyst bed and the resulting reformate stream is directed in an opposing or counterflow direction through the inner portion of the tube returning heat to the incoming gas.

In most reformers of this type, with catalyst-containing reactor tubes disposed in a pressure vessel, the hot burner gas is generated at a burner, generally within the reformer vessel, and accumulates in a primary (typically, upper) plenum within the vessel, contacting and heating the outer surface of the reactor tubes. In preferred reformer designs, the hot burner gas is directed through a cylindrical sleeve surrounding at least the lower portion of each reactor tube, so that the hot burner gas travels in close contact with the reactor tubes and effective heat transfer occurs. Thus, hot burner gas from the primary plenum flows through a narrow, annular passage between the internal wall of the sleeve and the external wall of each reactor tube, and into a secondary (lower) plenum, from which it is discharged. A seal plate forms a barrier across the width of the reformer vessel and around the individual reactor tube sleeves, so that the primary and secondary plenum are fluidly connected only via the annular passages, and therefore the hot burner gas must pass between a sleeve and reactor tube to exit the reformer vessel via the secondary plenum. In down-fired reformer designs the seal plate is typically located at or near the end of the reactor tubes farthest from the burner. The burner gas typically then exits the secondary plenum of the reformer vessel through a burner gas outlet.

Seal plates are generally described and disclosed in U.S. Pat. No. 4,921,680 and U.S. Pat. No. 5,264,008. In U.S. Pat. No. 5,470,360, no seal plate is used, the passages around the sleeves being instead packed with insulation and sealed to prevent bypass of hot gases around the sleeves. The insulation thus divides the interior of the vessel into two plenums.

In order to improve the heat efficiency of the reformer, the seal plate is preferably gas tight so as to prevent any of the burner gas from bypassing the sleeves and flowing directly from the primary plenum to the secondary plenum. Further, the seal plate must be designed so as to accommodate differential thermal expansions, for example, those arising from temperature differences between the reformer wall and the seal plate. As used herein, the term "expansion" refers to dimensional changes caused by heating or cooling a material, and includes a dimensional increases as well as dimensional decreases (contractions). Failure to adequately accommodate differential thermal expansion can in extreme cases cause the seal plate to buckle and fail. In less extreme cases, differential expansion can break the seal between the seal plate and the reformer vessel wall or the reactor tubes or sleeves. Differential thermal expansion is often further exacerbated because the seal plate and other reformer components may be fabricated of different materials and as a result have different coefficients of thermal expansion.

For reformers having a single reactor tube, such as, for example, that shown in FIG. 1 of U.S. Pat. No. 5,484,577 previously incorporated herein by reference, designing a seal plate tolerant of differential thermal expansion is more straightforward than for reformers having multiple reactor tubes, such as, for example, that shown in FIG. 3 of U.S. Pat. No. 5,484,577. In the latter design, complex seal arrangements and geometries are used to accommodate differential thermal expansion while maintaining a pressure tight seal. For example, the seal plate disclosed in U.S. Pat. No. 4,921,680 employs a flexible bellows connection between the seal plate and the reformer wall. The bellows can reportedly accommodate movements arising from differential thermal expansions. Seal plates employing complex geometries and many components may be expensive and complicated to build and install in the reformer vessel.

In the present design a burner exhaust gas collection assembly is used to collect the burner gas from the annular passages between the sleeves and reactor tubes, and to direct it to the outlet. A seal plate, dividing the plenum, is not required.

SUMMARY OF THE INVENTION

A catalytic reformer comprises a reformer vessel defining an interior plenum, and at least one reactor tube assembly disposed within the plenum. The at least one reactor tube assembly comprises a catalyst bed. The reformer further comprises a burner gas inlet for delivering hot burner gas to the interior plenum, a burner gas outlet, and a burner gas guide sleeve disposed substantially coaxially around at least a portion of the reactor tube assembly, defining an annular burner gas passage. A burner exhaust gas collection assembly connects the burner gas guide sleeve to the burner gas outlet.

The burner exhaust gas collection assembly is an integrated assembly of piping or interconnected passages. Inside the burner exhaust gas collection assembly the burner gas is not in direct contact with the interior walls of the reformer.

In preferred embodiments at least a portion of the burner exhaust gas collection assembly is compliant, to accommodate differential thermal expansion of the reformer components.

In an embodiment of a catalytic reformer with a single reactor tube assembly disposed within the plenum, the burner exhaust gas collection assembly comprises a conduit connecting the burner gas guide sleeve to the burner gas outlet. In preferred embodiments, the conduit is welded to the burner gas guide sleeve and to the burner gas outlet. Optionally, the conduit could be cast in a single piece. Such a unitary cast structure may also, optionally, include reactant and product stream conduits for directing those streams to and from the reactor tube assembly, respectively.

In an embodiment of a catalytic reformer with a plurality of reactor tube assemblies disposed within the plenum, the burner exhaust gas collection assembly comprises a burner exhaust gas manifold connected to the burner gas outlet, and individual conduits connecting each of the burner gas guide sleeves to the burner exhaust gas manifold. Thus, the burner gas is separately ducted from each annular passage to a common collection manifold from which it is discharged from the vessel at the burner gas outlet. Preferably the conduits are compliant to accommodate thermal expansion. For example, at least a portion of the conduit wall may be corrugated. In preferred embodiments the conduits are welded to the burner gas guide sleeves and to the burner exhaust gas manifold, and the burner exhaust gas manifold is preferably welded to the burner gas outlet. The conduits may each, optionally comprise a collection collar extending outwardly from the burner gas guide sleeve and circumscribing an end portion of the reactor tube assembly.

In some embodiments the burner exhaust gas manifold is cast as a single piece, which is preferably welded to the burner gas guide sleeves and to the burner gas outlet. Such a unitary cast structure may also, optionally, include the reactant and product stream manifolds. In further embodiments, substantially the entire burner exhaust gas collection assembly, including the burner exhaust gas manifold and conduits, may be cast as a single piece, which is preferably then welded to the burner gas guide sleeves and the burner gas outlet. Such a unitary cast structure may also, optionally, include reactant and product stream manifolds and conduits for directing streams to and from the reactor tube assemblies.

In another embodiment, a catalytic reformer with a plurality of reactor tube assemblies disposed within the plenum has a plurality of burner gas outlets, and the burner exhaust gas collection assembly comprises individual conduits connecting each of the guide sleeves to one of the outlets. Thus, the burner gas is separately ducted from each annular passage to an individual burner gas outlet.

The hot burner gas may be generated within the reformer vessel, for example the burner gas inlet may comprise a burner disposed within the plenum. Alternatively, the hot burner gas may be supplied from a source external to the reformer vessel, entering the vessel at the burner gas inlet. More than one burner gas inlet may be provided. The location of the burner gas inlet or inlets is a matter of design choice. For example, the reformer could be an up-fired or down-fired reformer. In embodiments illustrated below a down-fired centrally located burner is housed within the reformer vessel.

Preferably the reformer vessel is substantially cylindrical.

The conduits and manifolds described above need not be unitary structures. They may each comprise an assembly of interconnected parts.

BRIEF DESCRIPTION OF THE DRAWINGS

FIGS. 1A, 1B, 1C and 1D are sectional views of a catalytic hydrocarbon steam reformer with a plurality of reactor tubes and a burner exhaust gas collection assembly comprising a burner exhaust gas manifold.

FIG. 1A is a side sectional view taken in the direction of arrows A—A in FIGS. 1C and 1D.

FIG. 1B is a side sectional view taken in the direction of arrows B—B in FIGS. 1C and 1D.

FIG. 1C is a bottom sectional view taken in the direction of arrows C—C in FIG. 1A.

FIG. 1D is a top sectional view taken in the direction of arrows D—D in FIG. 1A.

FIG. 2 is a detailed side sectional view of a catalytic hydrocarbon steam reformer with a single reactor tube and a burner exhaust gas collection assembly.

DETAILED DESCRIPTION OF THE PREFERRED EMBODIMENTS

Figure 1B:
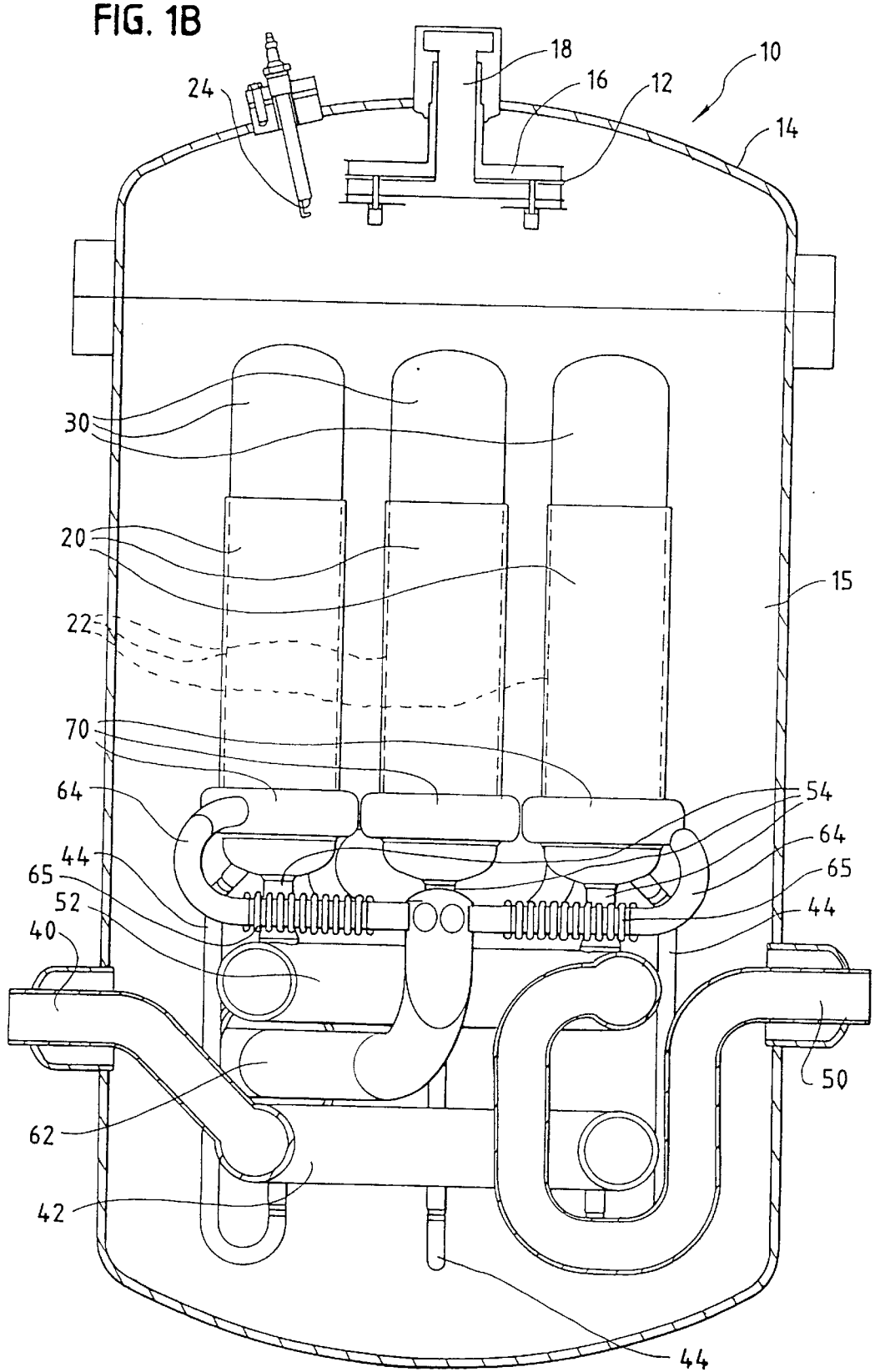

Turning first to FIGS. 1A and 1B, a catalytic hydrocarbon reformer 10 includes a multi-nozzled burner 12 located at the top of a substantially cylindrical reformer vessel 14. Burner 12 is supplied with a fuel stream through burner fuel stream inlet 16, and an oxidant stream through burner oxidant stream inlet 18. The burner fuel and oxidant mixture is ignited at burner 12 by a spark generator located at the end of an ignition mechanism or spark plug 24 (visible in FIG. 1B). The mixture is combusted at the burner 12 to create a hot burner gas stream in the interior volume or plenum 15 defined by the vessel 14. The reformer vessel 14 is typically formed in several pieces which are welded or bolted together at flanged connections. Typically the reformer vessel is lined with multiple layers of thermally insulating material (not shown), which fill a large portion of the plenum 15.

The reformer vessel 14 houses a plurality of reactor tubes 30, each containing a catalyst bed (shown as 135 in FIG. 2). A reactant fuel stream enters reactant fuel stream manifold 42 in the reformer vessel 14 at a reactant fuel stream inlet 40 (visible in FIG. 1B). From the manifold it is directed to the catalyst beds in the reactor tubes 30 via individual fuel stream conduits 44. The product reformate stream from each reactor tube is directed to a reformate stream collection manifold 52 via individual reformate stream conduits 54, and exits the reformer vessel 14 at reformate stream outlet 50 (visible in FIG. 1B).

In multi-tube reformers, such as that illustrated in FIGS. 1A–D, the reactor tube assemblies are preferably arranged in concentric tiers, rows or rings.

The lower portion of each reactor tube 30 has a burner gas guide sleeve 20 spaced substantially coaxially around it, defining an annular burner gas passage 22 (indicated by broken lines) between the outer wall of the reactor tube 30 and the inner wall of the sleeve 20. The hot burner gas generated at burner 12 passes through the annular passages 22 and is collected at the base of each reactor tube 30 and directed via individual burner exhaust gas conduits 64 to a common burner exhaust gas manifold 62, exiting the reformer vessel 14 at a burner gas outlet 60 (visible in FIG. 1A). Because the burner gas outlet 60 is fluidly connected to the plenum 15 only via burner exhaust gas manifold 62, conduits 64 and annular passages 22, substantially all of the hot burner gas is forced to pass through the annular passages 22, thus heating the reactor tubes 30. The annular burner gas passages may optionally include baffles, channels or other such elements to direct flow and/or induce turbulent flow.

The burner exhaust gas conduits 64 may comprise several interconnected sections. For example, in the illustrated embodiment, burner exhaust gas conduits 64 comprise a collection collar 70, at the base of each sleeve 20, a curved elbow section and a corrugated section 65. The burner exhaust gas conduit 64 from each reactor tube 30 is designed to accommodate or tolerate thermal expansion. For example, the burner exhaust gas conduits 64 depicted in FIGS. 1A and 1B are designed to accommodate thermal expansion as a result of a corrugated section 65 in the conduits 64. If at least a portion of the conduit 64 is compliant, it may accommodate differential thermal expansion and attendant movement of reformer parts within the reactor tube assembly. Tolerance to differential thermal expansion be introduced in other ways, for example, by extending the length of conduits 64, or by configuring the components so that the stresses caused by thermal expansion are mitigated.

Preferably the various interconnected manifold and conduit components in FIGS. 1A, 1B, 1C and 1D are welded together. For example, preferably burner gas conduit 64 is welded at one end to burner gas guide sleeve 22, and at the other end to burner exhaust gas manifold 62, and manifold 62 is preferably welded to burner gas outlet 60. Similarly the sub-components making up each of these components 62 and 64 are preferably assembled by welded joints. In another fabrication approach, manifolds 42, 52 and 62 could all be cast in a unitary structure or block, which could be connected to conduits 44, 54 and 64 and to inlet 40 and outlets 50 and 60, for example, by welding. Further still, manifolds 42, 52 and 62, and conduits 44, 54, and 64 may be cast in a unitary structure. In this case the unitary structure may be sufficiently robust to withstand any stresses arising from differential thermal expansion, without the burner exhaust gas collection assembly comprising a compliant portion.

FIG. 1C illustrates the configuration of the fluid stream manifolds and conduits in further detail. Reactant fuel stream manifold 42, which includes a toroidal shaped section, interconnects reactant fuel stream inlet 40 to six individual fuel stream conduits 44. Reformate stream collection manifold 52 (the toroidal section of which is obscured in FIG. 1C by manifold 42) is connected to reformate stream outlet 50. Six individual burner exhaust gas conduits 64 are centrally connected to a common burner exhaust gas manifold 62, which in turn is connected to burner gas outlet 60, as shown in FIGS. 1C and 1D.

FIG. 2 shows a catalytic hydrocarbon reformer 110, with a single reactor tube 130. Reformer 110 is similar in design to reformer 10 of FIGS. 1A, 1B, 1C and 1D, and includes a multi-nozzled burner 112, supplied with a fuel stream through burner fuel stream inlet 116, and an oxidant stream through burner oxidant stream inlet 118. The burner fuel and oxidant mixture is ignited at burner 112 by a spark generator 124, and is combusted at the burner 112 to create a hot burner gas stream in the interior volume or plenum 115 defined by the substantially cylindrical reformer vessel 114. As shown in FIG. 2, the reformer vessel is typically formed in several pieces which are secured together by bolts 125 at flanged connections 126.

A reactant fuel stream enters the reformer vessel 114 at a reactant fuel stream inlet 140, and is directed via reactant fuel stream conduit 144 to an annular catalyst bed 135 in the reactor tube 130. The reactant stream passes in contact with catalyst pellets 136 contained in the catalyst bed 135, and is converted into a hydrogen-rich reformate stream. The product reformate stream exits the catalyst bed 135 toward the top of reactor tube 130 and is directed in a counterflow configuration to the bottom of reactor tube 130 through an inner concentric annular gas return tube 148. The reformate stream is then directed to the reformate stream outlet 150 via reformate stream conduit 154.

The lower portion of reactor tube 130 has a burner gas guide sleeve 120 spaced substantially coaxially around it, defining an annular burner gas passage 122. The hot burner gas generated at burner 112 passes through the annular passage 122 and is collected at the base of reactor tube 130 and directed via burner exhaust gas conduit 164 to burner gas outlet 160. Because the burner gas outlet 160 is fluidly connected to the plenum 115 only via burner exhaust gas conduit 164 and annular passage 122, substantially all of the hot burner gas is forced to pass through the annular passage 122, thus heating the reactor tube 130.

In the embodiment illustrated in FIG. 2, burner exhaust gas conduit 164 comprises an annular collection collar 170 at the base of sleeve 120.

Typically the reformer vessel is lined with a thermally insulating material. As shown in FIG. 2, typically multiple layers of insulation 180 are employed, which fill a large portion of the plenum 115.

Again, various fabrication and construction techniques may be used to assembly the various components, including welding or casting, as described above.

The catalytic hydrocarbon reformers illustrated in FIGS. 1 and 2 are particularly suitable for steam reforming of natural gas.

The present reformer burner exhaust gas collection assembly obviates the need for a seal plate to force the burner gas through the annular passages by forming a seal across the width of the reformer vessel, dividing the plenum. Instead the burner gas is ducted from each annular passage to a burner gas outlet.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A catalytic reformer comprising:
   (a) a reformer vessel having interior walls defining a single interior plenum;
   (b) at least one reactor tube assembly disposed within said plenum, said at least one reactor tube assembly comprising a catalyst bed;
   (c) a burner gas inlet for delivering burner gas to said interior plenum;
   (d) a burner gas outlet;
   (e) a burner gas guide sleeve disposed substantially coaxially around at least a portion of each of said at least one reactor tube assembly defining an annular burner gas passage;
   (f) a burner exhaust gas collection assembly comprising a conduit extending from and sealed to said burner gas guide sleeve, said assembly fluidly connecting said burner gas passage to said burner gas outlet such that burner gas exiting said passage does not contact said interior plenum.

2. The catalytic reformer of claim 1 wherein said at least a portion of said burner exhaust gas collection assembly is compliant.

3. The catalytic reformer of claim 1 wherein said at least one reactor tube assembly is a single reactor tube assembly disposed within said plenum.

4. The catalytic reformer of claim 1 wherein said at least one reactor tube assembly is a plurality of reactor tube assemblies.

5. The catalytic reformer of claim 4 wherein said burner exhaust gas collection assembly further comprises a burner exhaust gas manifold connected to said burner gas outlet, and individual conduits connecting each of said burner gas guide sleeves to said burner exhaust gas manifold.

6. The catalytic reformer of claim 5 wherein said conduits are compliant.

7. The catalytic reformer of claim 6 wherein at least a portion of each of said conduits is corrugated.

8. The catalytic reformer of claim 5 wherein said conduits are welded to said burner gas guide sleeves and to said burner exhaust gas manifold.

9. The catalytic reformer of claim 5 wherein each of said conduits comprises a collection collar extending outwardly from said burner gas guide sleeve and circumscribing an end portion of said respective reactor tube assembly.

10. The catalytic reformer of claim 5 wherein said burner exhaust gas manifold is a unitary cast structure.

11. The catalytic reformer of claim 4 wherein said reformer comprises a plurality of burner gas outlets, and said burner exhaust gas collection assembly comprises individual conduits connecting each of said guide sleeves to one of said outlets.

12. The catalytic reformer of claim 1 wherein said burner gas inlet comprises a burner disposed within said plenum, for generating said burner gas within said plenum.

* * * * *